United States Patent Office 3,033,673
Patented May 8, 1962

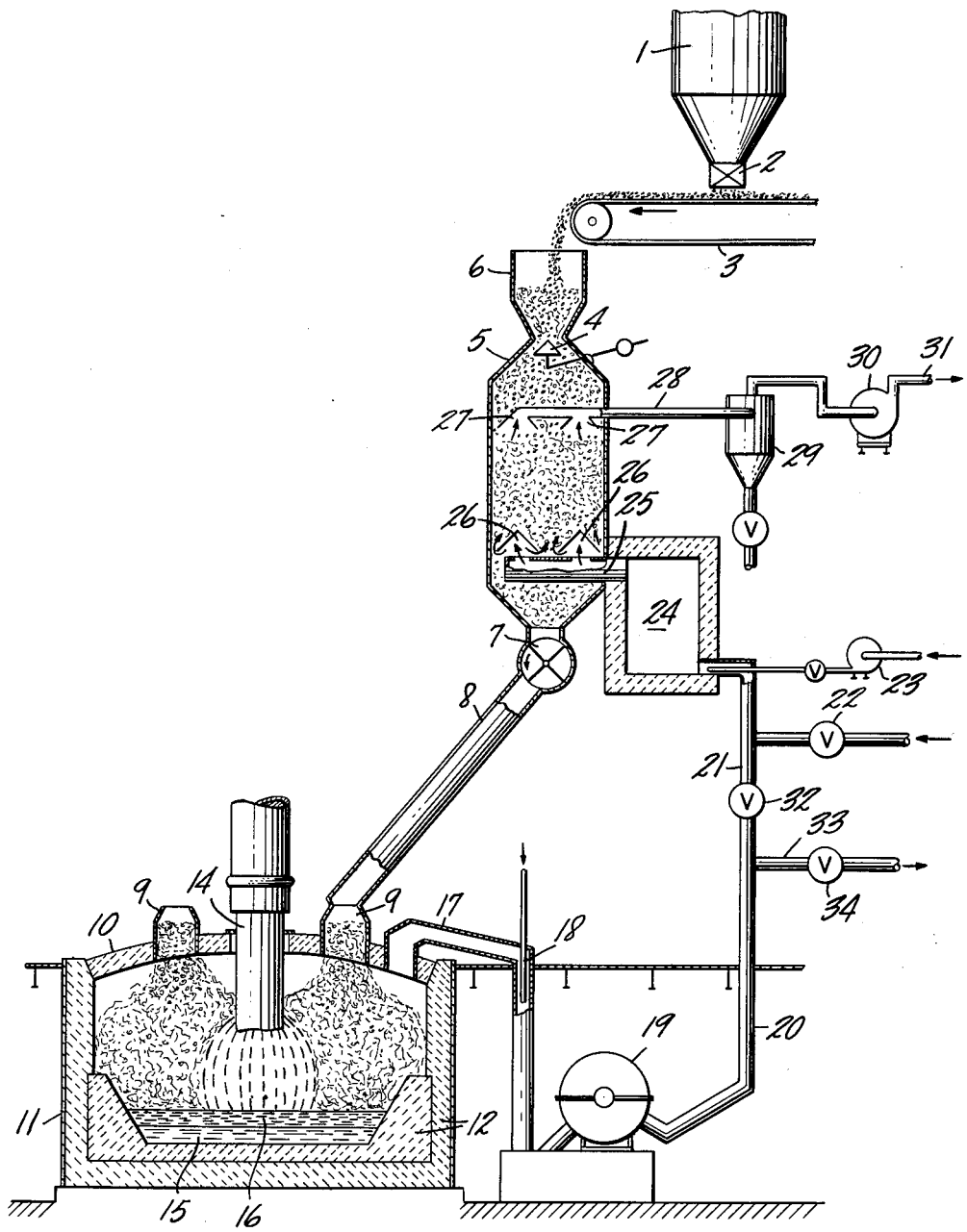

3,033,673
PROCESS OF REDUCING IRON OXIDES
Fredrik Christen Collin, Ljan, Oslo, and Toralv Båsen, Vagsbygd, near Kristiansand, Norway, assignors to Elektrokemisk A/S, Oslo, Norway, a corporation of Norway
Filed May 1, 1961, Ser. No. 107,286
Claims priority, application Norway May 3, 1960
5 Claims. (Cl. 75—34)

One of the recognized problems in connection with the direct reduction of iron ore has to do with the reduction of pellets made up of the iron ore and a reducing agent such as powdered coal or coke. The reduction of such pellets either to produce sponge iron or as a preliminary to further reduction in an electric smelting furnace has been frequently suggested, but so far no economical method of practicing such a process has been evolved.

We have now discovered that the principal problem with such a process arises from the fact that in normal case air is used to burn the fuel employed to supply the necessary heat and customarily sufficient air is supplied also to burn the CO in the gas generated during the reduction, so that additional thermal efficiency is obtained. As a result the flame or heating gas employed has an oxidizing effect and we have found that because of this a continuous reoxidation is taking place upon the surface of the pellets.

When pellets containing iron ore and carbonaceous reducing agent are heated above 900° C. the carbonaceous materials act with the oxygen in the ore and this reduces the pellets progressively inwardly. Heretofore it has been supposed that the carbonaceous material and evolved CO gas would protect the newly reduced metal. However, we have found that once the carbon has volatilized off from the outer part of a pellet the freshly reduced surfaces will be substantially pyrophoric and will very quickly reoxidize if the atmosphere has any oxidizing effect. This means that there is a great waste of carbonaceous material and the product is far from being sponge iron and ordinarily has to undergo substantial additional reduction in a smelting furnace.

In accordance with the present invention we make pellets comprising iron ore and carbonaceous material such as coal or coke, preferably in approximately stoichiometric proportion of reducing agent as required for the complete reduction. If complete reduction is not demanded the amount of carbonaceous material may be reduced somewhat but ordinarily a slight excess over the stoichiometric proportion should be used. These pellets are then treated in an appropriate apparatus with a hot gas that is definitely not oxidizing. Since the gas is to be the source of heat and therefore has been subjected to combustion, the air employed must be carefully controlled so that the gas used for treating the pellets will comprise CO (and usually some $H_2$) in such proportion that the ratio of CO to the sum of the CO plus the $CO_2$ (and simultaneously the ratio of the $H_2$ to the sum of the $H_2$ and the $H_2O$) is at least 0.67. Preferably this ratio is somewhat higher, say about 0.7 and it is even better to have it as high as 0.75. A higher proportion of CO is not necessary for it is to be remembered that this gas is used essentially to bring heat to the pellets and not as a primary reducing agent. Since the gas is to supply the heat to the pellets it must be heated high enough to raise the temperature of the pellets up to 900° C. and also to supply the heat of reduction. This means that the gas must definitely have a temperature above 900° C. and the temperature may range up to about 1150° C. For ordinary purposes a gas at a temperature of about 1100° C. is satisfactory.

The treatment of the pellets can take place in any appropriate type of apparatus. We have found a shaft type furnace is excellent for this purpose and therefore it is shown in our illustrative example. However, other types of furnace giving good contact between gas and pellets may be used such as a furnace employing traveling grates covered by gas hoods or the like. The process may be employed for substantially complete reduction of the pellets or for partial reduction and preheating with the pellets subsequently being introduced into an electric pig-iron furnace for final reduction and smelting.

The gas is preferably prepared and brought up to temperature by burning hydrocarbon material with limited and controlled amounts of air in a separate combustion chamber. The hydrocarbon may range anywhere from methane to fuel oil, the important feature being that the air is so controlled that the ratio of CO to the sum of the CO plus $CO_2$ in the products of combustion must exceed 0.67. Actually the best way of carrying out this process is to burn natural gas or gases that result from cracking processes. Since, as stated, this gas is not intended as a reducing agent but is intended to be used as a heating means, relatively large quantities of gas will have to be employed, sufficient to carry the necessary calories for bringing the pellets up to reduction temperature of at least 900° C. and for supplying the heat of reduction. While some other source of heat may be employed as a supplement, it would not supply oxidizing products of combustion to reduce the CO proportion below the required percentage. The exact amount of gas required for the process will vary depending upon preliminary heating of the pellets and the like but it can be readily computed.

As this process proceeds, gas will be evolved from the pellets and it will be found that this gas will have a composition more or less corresponding to the heating gas employed, that is it will have an excess of CO above that to meet the required ratio stated above. As a result, large quantities of gas will be withdrawn from the process. Such gas will ordinarily have a calorific value of from about 900 to 1000 kcal. $Nm.^3$ which is about the same as blast furnace gas.

In the accompanying drawing is a schematic sectional view of a plant for utilizing our invention for prereducing and preheating ore which is to be finished in an electric smelting furnace.

In the drawings 1 is a storage bin for the pellets. Control apparatus indicated at 2 feeds the pellets in predetermined quantities onto a conveyor belt 3 which delivers them into a hopper 6. From the hopper 6 the valve 4 lets the pellets in proper amounts into the shaft furnace 5. It is understood that the shaft furnace is only indicated here schematically and actually it will be a device equipped with a refractory lining.

At the bottom of the shaft furnace 5 is a discharge mechanism 7 for gas tight discharge of the hot prereduced charge which slides through one or more pipes 8 down through charging openings 9 in the roof of the electric furnace 10. The electric furnace is further provided with a casing 11 and a refractory lining 12. The current is supplied to the charge 13 by means of electrodes 14 which pass through the furnace roof. The liquid mteal 15 and slag 16 collect in the bottom of the furnace and are tapped at regular intervals in usual manner. The gas is exhausted from the furnace through a pipe 17, in the furnace roof. Such gas is cooled and cleaned by addition of water for example through nozzle 18 and is further cleaned as it passes through the fan 19. This fan forces the clean gas into the clean gas pipe 20.

The gas pipe 20 is provided with a valve 32 which will permit a controlled amount of this gas (if desired) to pass into the pipe line 21. Excess gas is discharged through pipe 33 provided with valve 34. A combustion gas, such as natural gas rich in methane, or cracking gas may be admitted in controlled amounts through valve 22 and pass into pipe 21. The gas then passes into the combustion chamber 24 where it burns with a controlled amount of air supplied through a fan 23. The hot combustion gases with the proper proportion of CO and at the proper temperature pass from here into the lower part of the shaft 5 through inlet ducts 25 where it is distributed by members 26. The gas passes upward through the shaft in countercurrent to the charge and is drawn out through the outlet openings 27 and the pipe 28. The hot discharge gas is freed from some of its dust content in the dust separator 29. As the dust separator and the shaft will set up some resistance, a fan 30 is supplied to suck the gas through the system. From the fan 30, the waste gas passes through pipe 31 to any desired point of use such for example at a steam plant.

As an example of our process to be carried on with the apparatus just described we selected the case where iron ore is to be partly prereduced and preheated in the shaft furnace and then is passed into the electric smelting furnace for final smelting.

Finely powdered iron ore (50–90% minus 200 mesh Taylor) was pelletized together with slightly more than the stoichiometric proportion of bituminous coal necessary for reduction using 5% Portland cement as a binding agent. The raw pellets were hardened by storing for at least three days whereby they attained a point strength of about 50 kgs. The self-hardened pellets were stored in the storage bin 1 from which they were discharged into the hopper 6 as previously described.

To prepare the gas, in this instance we used natural gas rich in methane. With an ore containing 55%–65% Fe, we used about 420 $Nm.^3 CH_4$ per 1000 kgs. pigiron produced. Methane was admitted into the pipe 21 through the valve 22 and air was introduced by the fan 23 in such proportions that one mol $CH_4$ gave 13 mols of combustion gas. In these proportions the combustion gas reached a temperature of about 1100° C.

By using the 420 $NM^3$ methane per metric ton of pigiron and using the proportions of air stated above, a partially combusted gas of the following composition was obtained:

| | Percent |
|---|---|
| $H_2$ | 23 |
| CO | 12 |
| $H_2O$ | 8 |
| $CO_2$ | 4 |
| $N_2$ | 53 |

This gas had the ratio of CO to the sum of the CO plus $CO_2$ equal to about 0.75 which has no oxidizing effect upon the metallic iron since the equilibrium at 900° C. is 0.67.

The heat content of the gas was sufficient to cover the heat requirement for prereduction of the oxides of the iron ore by means of the carbon in the pellets and 50%–70% of the oxygen content of the ore was removed in the shaft furnace and the pellets preheated to a temperature of approximately 900° C.

The charge was transferred to the electric furnace through the pipe 8 directly, without cooling, and smelted with a power consumption of 900–1000 kwh. per ton of pigiron. This may be compared with the usual consumption in pigiron production in the same furnace of from 2000–3000 kwh. per ton. These figures indicate that the pigiron production per kwh. was increased two to three times.

About 30%–35% of the combustion value of the natural gas was utilized in the prereduction furnace and some additional gas was generated from the reduction of the iron ore. The resulting exit gas still contained large combustion values which were used in a steam generator.

It is to be noted that in this particular example none of the furnace gas was employed in the combustion chamber 24. However, in some instances small amounts of such furnace gas may be used to increase the volume of gas, provided that the necessary proportions of CO and the necessary temperature are maintained.

It is understood that the example given is intended only by way of illustration and the same may be modified in many particulars.

We claim:

1. Process for the solid state reduction of iron oxides which comprises forming pellets of the oxide with a carbonaceous reducing agent in amount to reduce the oxide and heating such pellets in a stream of gas comprising the products of combustion of a hydrocarbon and air at a temperature of from about 900° C. to 1150° C., such gas having a ratio of CO to $CO+CO_2$ of at least 0.67 and in an amount sufficient to heat the pellets to at least above 900° C. whereby the oxide is reduced by a carbonaceous reducing agent without substantial reoxidation.

2. The process of claim 1 which includes the further step of producing the heating gas by burning the hydrocarbons with limited amounts of air so as to produce the specified ratio of the CO to the sum of $CO+CO_2$.

3. A process as specified in claim 1 which includes the step of burning the equivalent of 400 $Nm.^3$ of methane per 1000 kgs. of iron with a deficit of air in a combustion chamber in such a proportion that 1 mol of methane gives about 13 mols of combustion gases at 1100° C. and this gas is used to heat the pellets as specified.

4. A process as specified in claim 1 in which the ore is finely ground and pelletized together with ground raw coal and a binding agent and these pellets are heated countercurrently in a gas stream supplying sufficient sensible heat to bring the pellets up to a temperature of at least 900° C. and to supply the heat of reaction for prereduction of the iron.

5. A process as specified in claim 4 in which the prereduced and heated pellets are transferred while still hot to an electric furnace for final reduction and smelting.

References Cited in the file of this patent

UNITED STATES PATENTS

| 1,370,915 | Riveroll | Mar. 8, 1921 |
| 1,427,436 | Bradley | Aug. 29, 1922 |
| 2,894,831 | Old et al. | July 14, 1959 |